United States Patent

[11] 3,633,375

[72] Inventor John A. McLean
    Columbus, Ohio
[21] Appl. No. 28,676
[22] Filed Apr. 15, 1970
[45] Patented Jan. 11, 1972
[73] Assignee Westinghouse Electric Corporation
    Pittsburgh, Pa.

[54] REFRIGERATOR COOLING SYSTEM DESIGN
    8 Claims, 3 Drawing Figs.
[52] U.S. Cl. .................................................. 62/180,
    62/186, 62/419, 62/157, 62/208
[51] Int. Cl. .................................................. F25d 17/00
[50] Field of Search ......................................... 62/180,
    182, 186

[56] References Cited
    UNITED STATES PATENTS
2,866,323  12/1958  Candor ........................ 62/180
2,526,063  10/1950  Booth ......................... 62/186
2,546,363   3/1951  Jaeyer ........................ 62/186

Primary Examiner—William J. Wye
Attorneys—F. H. Henson, E. C. Arenz and R. B. Farley ABSTRACT: A refrigerator is provided where the cold air for refrigerating the fresh food space is force-circulated over a portion of the wall surface of this food compartment. This wall surface also serves as a wall for the freezer compartment of the refrigerator so that there is heat removal from the fresh food space through the food compartment wall. A portion of the time the fresh food side of this wall is maintained at above 32° so that water will condense thereon and run by gravity to a convenient point for disposal. A circulating fan within the fresh food space is used so that moisture does not condense on the containers and shelves therein with a resultant dripping of moisture on the food stored at lower levels of the food storage space. A single evaporator cooler is provided and this is contained in the frozen food space of the refrigerator, with a fan also provided in this space for circulating air within the frozen food space. To ensure that the wall between the frozen food space and the fresh food space is sometimes above 32° F., the fan in the fresh food space is in active circulating condition at all times when the refrigerator compressor and the fan for the frozen space are not operating.

PATENTED JAN 11 1972 3,633,375

WITNESSES
Alfred D. Colaizzi
James F. Young

INVENTOR
John A. McLean

Richard B. Farley
ATTORNEY

REFRIGERATOR COOLING SYSTEM DESIGN

BACKGROUND OF THE INVENTION

1. Field of the Invention

This invention relates to a system for cooling refrigerated spaces and, more specifically, relates to a system for cooling a frozen food space and fresh food storage space by the use of a single evaporative cooler.

2. Description of the Prior Art

In single-evaporator, forced-convection, two-temperature refrigerators, it has been the general practice to circulate the major portion of the air through the evaporator coil and freezer compartment. A small portion of the refrigerated air was then also directed through the fresh food storage space to provide refrigeration for it and to pick up excess moisture and carry the heat and moisture to the evaporator coil. Such arrangements have resulted in an excessive drying of exposed food in the fresh food storage compartment and an excessive number of times in which the defrost arrangement for the refrigerator had to be activated.

A known improvement over this arrangement for refrigeration has been developed by others where the cold air for refrigerating the fresh food space is circulated over some portion of the outside surface of this food compartment. This provides for heat removal from the fresh food space through the food compartment wall. By various arrangements the refrigerated part of the food compartment wall is intended to be maintained at above 32° F. for at least a portion of the time so that water which is condensed on this part of the wall may run by gravity to a convenient point for disposal. Unless a circulating fan within the fresh food space is used, it has been found that this type of system permits too much moisture to condense on containers and shelves with a resultant dripping into foods stored at the lower levels of the fresh food space. Further, even with the addition of such a circulating fan, a rather complicated control system had to be provided to insure that the refrigerated portion of the compartment wall had a temperature of above 32° F. for a portion of the refrigeration cycle so that proper drainage of moisture could be obtained. Accordingly, it would be advantageous to provide a single-evaporator, forced-convection, two-temperature refrigerator with a circulating fan in the fresh food space and with a control system incorporating this circulating fan into the overall refrigeration system to ensure that the wall disposed between the frozen space and the fresh food space was maintained, for at least a portion of the time, above the critical freezing temperature of 32° F.

SUMMARY OF THE INVENTION

The instant invention is particularly applicable to a side-by-side type of refrigerator where a large area of vertical insulated wall divides the frozen food and fresh food spaces. The frozen food space is cooled by an evaporator coil which may be placed against the rear wall of the freezer compartment. A fan distributes air through this evaporator coil and the frozen food space, with a substantial portion of this air being passed through an air duct formed against the wall dividing the fresh and frozen food spaces. Because of the high velocity of air maintained in this duct during frozen food fan operation, a high coefficient of surface heat transfer will occur to provide the fresh food space with a large amount of refrigeration. This frozen food fan is arranged to operate when the compressor of the refrigerating system is operating and to be off when the compressor is no longer operating so that the surface coefficient of heat transfer at this side of the common wall will be at a low value during shutdown of the fan. Control of the compressor and fan is obtained by a temperature control adapted to maintain a 0° F. freezer temperature, for example.

A fan is also mounted within the fresh food space so as to circulate air through a duct or conduit located against the common wall dividing the two compartments. This forced circulation of air within the fresh food compartment will provide a high surface coefficient of heat transfer on the fresh food space side of the dividing wall when this fan is operated. The fresh food space fan is normally controlled by a temperature control so as to maintain about a 38° F. temperature in the fresh food space. However, its operation is modified so that, during the off period of the compressor and therefore the off period of the fan in the frozen food compartment, the fresh food space fan is forced to operate to insure that the temperature of the surface of the dividing wall in the fresh food space will reach a temperature above 32° F.

The design of the system is such that the velocity of the air on either side of the dividing insulated wall, taken with the heat conductivity through this wall, results in the surface temperature on the fresh food side of the dividing wall being above, but close to, 32° F., when both fans and the compressor are operating. This surface will fall below 32° F., then, only when the fan in the fresh food compartment is controlled and stopped by its temperature control while the compressor and freezer fan operate. This surface will again warm rapidly to above 32° F. during a compressor off period since, at this time, the fresh food space fan will again begin to operate to circulate 38° F. air against the dividing wall surface. Because the dividing wall surface on the fresh food space side will be below the dewpoint of the fresh food air, any moisture present in the air will condense on this wall and flow by gravity to a conveniently mounted drain tube to be carried out of the refrigerator cabinet.

A refrigeration control system to control the aforementioned operation of the compressor and the two fans, and a defroster arrangement for the frozen food space is also provided to carry out the principles of the invention.

DESCRIPTION OF THE PREFERRED EMBODIMENT

Figure 1:
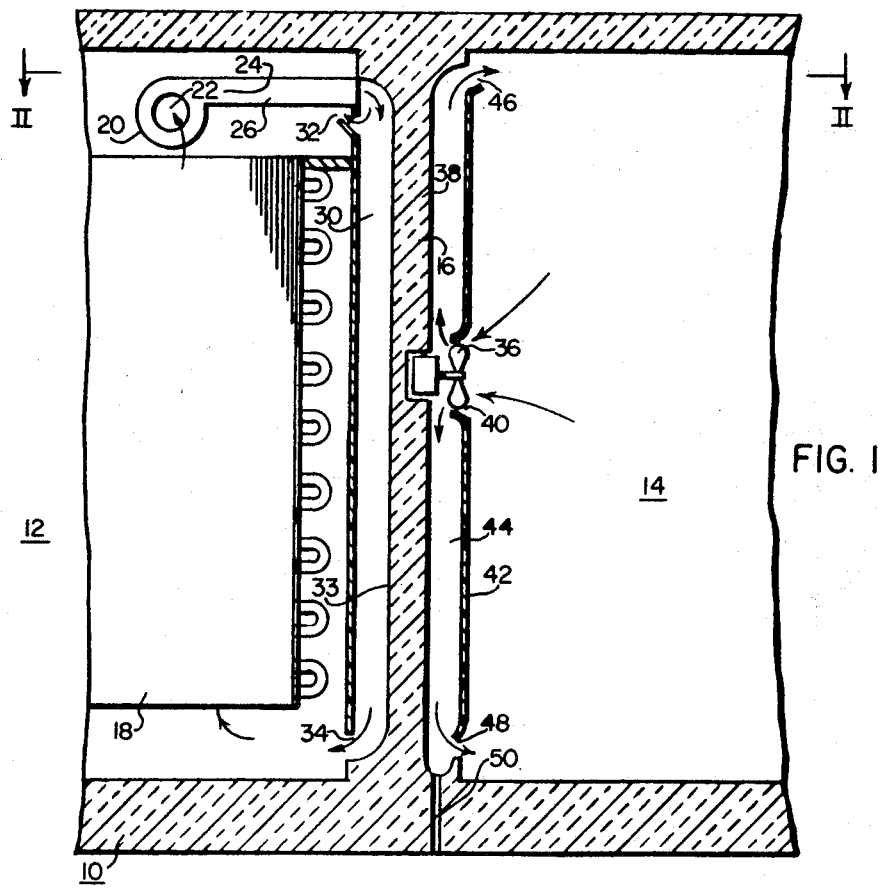
FIG. 1 is a view in front sectional elevation which partially shows the refrigerator and the mechanical operating components of the refrigeration system for it.
Figure 2:
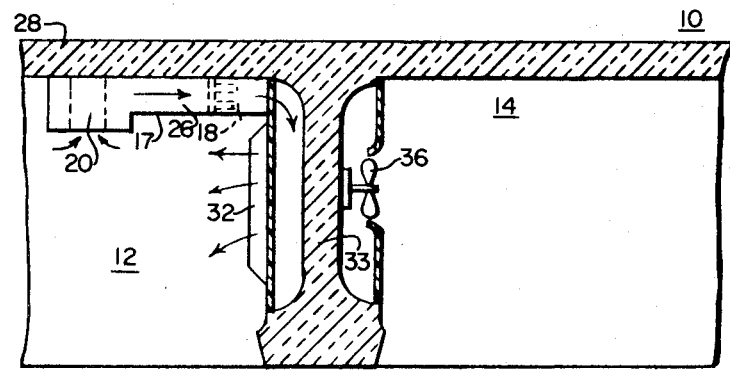
FIG. 2 is a plan view in cross section of the apparatus of FIG. 1, taken generally on line II—II of FIG. 1.

The structure and advantages of the instant invention will become more apparent as reference is made to the drawings wherein a portion of a refrigerator 10 (FIGS. 1 and 2) is shown having a frozen food compartment 12 and a fresh food compartment 14 disposed in a side-by-side relationship with an insulated dividing wall 16 disposed therebetween so that frozen food compartment 12 may be refrigerated to a lower temperature than the fresh food compartment 14. Cooling for both compartments is provided by an evaporator coil 18 situated behind a rear wall 17 of the frozen food space 12 and located so that air circulating over its individual coils will provide a cooling effect to the air in the frozen food compartment 12.

A fan 20 provides a forced airflow through this evaporator coil by receiving air through an inlet 22 and discharging the air through an outlet 24. The discharge 24 is in direct communication with a duct 26 that is substantially the same width as the thickness of the evaporator coil 18 and extends towards the fresh food compartment 14 along the back side of the refrigerator along a portion of a rear wall 28 that forms one of the walls outlining the peripheries of the freezing compartment 12 and between it and the rear wall 17. Duct 26 communicates with a duct 30 disposed against dividing wall 16 and dimensioned to substantially cover the full length and width of this wall. This duct is open at both its upper and its lower ends to form exits 32 and 34 which discharge the air driven by the fan 20 both above and below the evaporator coil 18. The exits 32 and 34 extend for approximately two-thirds the depth of the freezer compartment 12 and the duct 30 so as to distribute the air driven by the fan 22 throughout the freezing space 12 forwardly of the evaporative coil 18, with a face 33 of dividing wall 16 receiving a major cooling effect from the circulating air.

A second fan 36 is disposed in the fresh food compartment 14 to provide a circulating flow of air on a face 38 on the fresh food compartment side of dividing wall 16. This fan is mounted on the wall 16 so as to be disposed intermediate its height and width, with an inlet 40 for the air flowing inwardly here as directed by the fan 36 being provided at substantially this same location. A panel 42 provides a duct or conduit 44 to receive the discharge from the fan 36, with this conduit being formed substantially over the entire area of the dividing wall 16. More specifically, the wall 42 extends contiguous to the wall 16 for its entire linear and lateral extent to thereby form the conduit 44 between it and the wall 16 so that air entering through fan entrance 40 is driven by the fan 36 along and against the dividing wall 16 for substantially its entire length and width. A pair of discharges 46 and 48 located, respectively, at the upper and lower ends of the duct 44 permit the air circulated against the wall 16 to be discharged into the fresh food space 14, proper, so as to cool this space and any food located therein.

The general operation of the refrigerator 10 will now be described. Evaporator coil 18 is controlled as to provide a temperature of, say 0° F. within the freezer space 12 with the fan 20, when operating, providing a rapid flow of air through conduit 30 thereby insuring a fairly high heat transfer coefficient at the boundary between this flow of cool air and the face 33 of dividing wall 16. Refrigeration for the fresh food space 14 is derived from the heat transfer through the dividing wall 16, with the fan 36, when operating, providing a fairly high heat transfer rate at the boundary between the face 38 of dividing wall 16 and the flow of air within the conduit 44 as propelled by the fan 36. Discharge exits 32, 34 and 46, 48 ensure that both the freezer space 12 and fresh food space 14 receive a circulation of cooling air throughout each compartment. In the fresh food compartment 14 any moisture contained in the air in this refrigerated space will tend to condense out on the face 38 of the dividing wall 16 since this face is generally above 32° F. but at a lower temperature than any of the other surfaces in this compartment. This condensate is permitted to drain down the dividing wall 16 to be collected at the bottom thereof for exit through a condensate drain 50.

Figure 3:
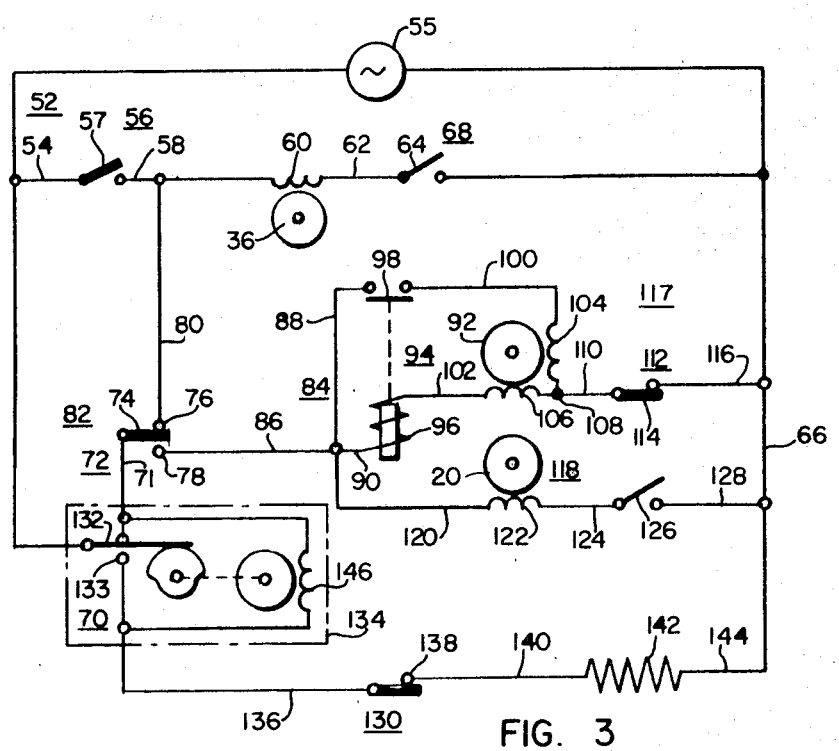
FIG. 3 is a schematic diagram of the control system and its operative relationship to the refrigeration system.

Turning to FIG. 3, the control system for the air-conditioning system will now be detailed. A refrigerator control system 52 includes a lead 54 extending from one side of an AC source 55 for electrical connection to a thermostatic control 56 mounted within the fresh food compartment of the refrigerator. This thermostatic control contains a switch 57 which is placed in a closed, current-carrying condition when the temperature within the fresh food storage space 14 exceeds 38°, for example. A lead 58 extends from the other side of the switch of the thermostatic control 56 to a winding 60 of a refrigerator fan 36 so that this fan is actuated when signaled by the closed thermostatic control 56. A lead 62 extends from the opposite end of the winding 60 of the fan 36 to be connected to a door operated switch 64 which is placed in a noncurrent-carrying condition whenever the door the the fresh food compartment 14 of the refrigerator cabinet is opened. To complete the circuit for actuation of the refrigerator fan 36 by thermostatic control 56, a lead 66 extends from the opposite side of door operated switch 64 to the AC source 55, this lead, of course, being in electrical connection with one of the contacts of the door operated switch 64. By the arrangement just described, a fresh food fan-operating circuit means 68 is provided which will operate the fresh food compartment fan 36 whenever the door to this compartment is closed and whenever the thermostat 56 signals that the temperature of this space is above, for example, 38° F.

A defrost timer operated switch (to be described in greater detail later) 70 also is connected to the lead 54 to be electrically connected to a freezer thermostatic control 72 when the switch 70 is in its upper position through a lead 71. The thermostatic control 72 is contained within the frozen food compartment 12 and is capable of closing against a contact 76 or a contact 78 by means of a switch blade 74, with the contact 76 closed representing the position that the freezer thermostatic control 72 assumes when the temperature in the freezer compartment is below or at its setting. With the switch blade 74 in this position, an electrical connection is formed between it and a lead 80 that extends upwardly so as to be electrically connected with the lead 58.

By the circuit arrangement just described, i.e., the defrost timer operated switch 70, the lead 71, the switch blade 74 of the thermostatic control 72, the contact 76 and the lead 80, an overriding circuit means 82 is provided which ensures that the fresh food compartment fan 36 is operating whenever the frozen food compartment thermostatic control 72 is not signaling for operation of the evaporator coil 18 to provide refrigeration within the frozen food compartment 12. It is specifically pointed out that the fresh food compartment fan 36 will operate with the switch blade 74 of thermostatic control 72 in the position related, completely independent of the temperature conditions imposed on the refrigerator fresh food compartment thermostatic control 56, since the defrost timer operated switch 70, lead 71, thermostatic control 72 and lead 80 will provide a flow path for current through the winding 60 of the fresh food compartment fan 36, parallel to the flow path through thermostatic control 56.

A compressor operating and freezer fan operating circuit means 84 is also provided. A lead 86 extends from and is an electrical connection with the contact 78 of the thermostatic control 72. This lead is extended to form a pair of branch leads 88 and 90 that provide for actuation of a compressor-driving electric motor 92, with this motor driving a compressor (not shown) for the refrigeration system. Both leads 90 and 88 extend to and are in electrical connection with a starting relay 94 which includes a winding 96 attached to lead 90 and a switch 98 which closes to be in electrical contact with lead 88 upon sufficient current flowing through the winding 96 to afford magnetic attraction for it. Leads 100 and 102 extend, respectively, from the opposite contact of the switch 98 and from the opposite side of the winding 96. Lead 100 is connected at its opposite end to the starting coil 104 of the motor 92 and lead 102 is connected at its opposite end to the main winding 106 of the motor 92. The starter winding 104 and the main winding 106, as is conventional, join together at a terminal 108 opposite to their connections with the leads 100 and 102. A lead 110 extends from the terminal 108 to a motor overload protector switch 112 which takes the form of a bimetallic switch element 114 that will operate to open the circuit to the motor 92 when the current and the temperature of protector 112 have assumed set overload values for a predetermined period of time. A lead 116 extends from a contact of the overload protector switch 112 for connection to the lead 66 that also forms a portion of the circuit means for actuation of the fresh food space fan 36.

It should be clear from the circuitry just described that electric motor 92 will be actuated (with the defrost timer operated switch 70 in its upper position) upon switch blade 74 assuming an abutting position with contact 78. This position is dictated by the temperature within the freezer compartment, that is, at some temperature, for example, above 0° will cause the thermostat 72 to move the switch blade 74 into contact with contact 78. This energizes leads 88 and 90 and, because of the high current surge through the winding 96, the switch 98 closes to provide current to the starting winding 104. After the motor 92 has assumed an active operating condition (rotating), a reduced current supplied to the main winding 106 maintains operation and the reduced current flow through winding 96 permits contacts 98 to open thereby deenergizing start winding 104. The overload protector 112 is in a current-carrying capacity unless overload conditions are reached to complete the circuit for the flow of current through the leads 116 and 66 back to the opposite side of the AC source 55. Such circuitry may be characterized as a compressor motor-actuating circuit means 117.

A circuit means 118 for activation of the freezer compartment fan 20 is also provided. It includes a lead 120 that extends from and is an electrical connection with the lead 86 and a winding 122 of the freezer fan 20. A lead 124 extends from the opposite side of the winding 122 for connection to a door operated switch 126, this switch assuming a closed current-carrying condition whenever the door to the frozen food compartment 12 is closed. A lead 128 extends from an opposite contact of door-operated switch 126 so as to be electrically connected to the lead 66 to provide a path flow for current to the other side of the AC source 55. Thus, with the thermostat control switch 72 in a closed position with contact 78, not only is the electric motor 92 energized, but also the freezer fan 20 so that cooling provided by the evaporator coil 18 is imparted to a flow of air which is force-fed through the duct 30 by the fan 20.

Although defrosting of the fresh food compartment 14 is not required since the combined functioning of the fans 20 and 36, as well as the thermal conductivity characteristics of the dividing wall 16, ensure that the face 38 is, for most of the time, above the temperature of 32°, a defrost arrangement is provided for the frozen food compartment 12. Its actuating circuit means 130 includes a contact blade 132 of the defrost timer-operated switch 70 which is in electrical connection with one side of the AC source 55. This contact blade (in its lower nonillustrated position) is in electrical connection with a contact 133 of the switch 70 of a defrost timer 134 which may be set on some time delayed cycle such as 12 hours. A lead 136 is electrically connected to the opposite contact 133 of the defrost timer 134 and extends to and is in electrical connection with a defrost thermostat 138, with this thermostat controlling the temperature at which defrost heating is terminated for the evaporative cooling coil 18. A lead 140 extends from the defrost thermostat 138 for electrical connection with a defrost heater 142 which provides the heat for the defrost cycle. This circuit is completed by a lead 144 which extends from defrost heater 142 so as to be in electrical connection and current carrying capacity with lead 66 that, as set out previously, returns to the other side of the AC source 55 through the defrost timer-operated switch 70, the connecting lead 136, the defrost thermostat 138, defrost heater 142 and lead 144 back into the other side of the AC source 55 through lead 66.

As is conventional, the defrost timer 134 operates to open the defrost timer switch 70 relative to the lead 71 at preset intervals, say of 12 hours duration, to open the circuit to the compressor and to close the circuit to the defrost heater 142. This defrosting condition continues for approximately 25 minutes with the defrost thermostat 138 opening sometime during this time period to thereby open the circuit to the defrost heater 142. The timer motor (represented by a winding 146 in FIG. 3) remains energized for the rest of the 25-minute period through the circuit from it to lead 71 and thence to the main compressor winding 106 to lead 66 and then back to the AC source 55. At the termination of the 25-minute period, the contact blade 132 is forced back to its upper position to provide refrigeration for the system. The defrost thermostat 138 recloses when the evaporator cooling coil is again at a preselected cold temperature.

Although only a single embodiment of the invention has been shown and described, it should be apparent to those skilled in the art that modifications can be made therein without the exercise of invention. For example, the system described could be easily utilized with a refrigerator having frozen food and fresh food compartments disposed vertically rather than side by side. The frozen food space fan and fresh food space fan could also be placed at different locations than those illustrated so long as a flow of air was provided by each fan which moved along the dividing wall between the fresh and frozen food compartments or the dividing wall on either side could be extended (by corrugations or fins, for example) to provide the desired heat transfer required. Additionally, a more sophisticated system could be utilized than the one disclosed wherein an extra thermostat control could be provided which would control and be sensitive to the coldest area on the surface of the dividing wall and this thermostat could then disconnect the freezer fan and force operation of the fresh food fan when such temperature was reached. Such an arrangement, of course, would ensure that there were no unwanted frost accumulation on the surface of the dividing wall which was open to the fresh food compartment and even more severely limit moisture pickup from the food stored in the fresh food compartment.

What is claimed is:

1. A refrigerator including;
   a. a frozen food compartment,
   b. a fresh food compartment,
   c. a common dividing wall disposed therebetween,
   d. cooling means for said frozen food compartment including an evaporator and means for circulating chilled air from said evaporator along the frozen food compartment side of said dividing wall,
   e. control means for controlling the cooling operation in said frozen food compartment in response to a demand for cooling in said frozen food compartment,
   f. means for circulating an independent flow of air in said fresh food compartment along the fresh food compartment side of said dividing wall,
   g. control means for effecting said independent flow of air in said fresh food compartment independent of the cooling operation in said frozen food space, and
   h. control means for effecting said independent flow of air in said fresh food compartment in accordance with the termination of the cooling operation in said frozen food compartment in response to a satisfied demand in said frozen food space and independent of the demand for cooling in said fresh food compartment.

2. An air-conditioning system for a refrigerator comprising;
   a. a frozen food compartment fan-operating circuit,
   b. a fresh food compartment fan-operating circuit,
   c. a thermostatic control means for actuating said frozen food compartment fan-operating circuit for maintaining a desired temperature for said frozen food compartment,
   d. said thermostatic control means also providing for energization of said fresh food compartment fan-operating circuit,
   e. said thermostatic control means providing for actuating of only one of said fan-operating circuits at a time.

3. The combination set out in claim 2 wherein said thermostatic control means takes the form of;
   a. a switch blade,
   b. a pair of contacts engageable by said switch blade, and
   c. said switch blade being capable of contacting only one of said contacts at a time.

4. The combination set out in claim 3 wherein said frozen food fan operating circuit includes;
   a. fan means in series relationship to said thermostatic control means, and
   b. a compressor electric motor means disposed in parallel circuit relationship with said fan means.

5. The combination set out in claim 4 wherein;
   a. a thermostatic control means is provided for a fresh food compartment, and
   b. said thermostatic control means is disposed in parallel circuit relationship with said first mentioned thermostatic control means.

6. The combination set out in claim 5 wherein;
   a. said first mentioned thermostatic control means actuates said compressor electric motor means simultaneously with actuation of said frozen food compartment fan-operating circuit.

7. The combination set out in claim 6 wherein;
   a. a defrost control circuit is provided for the frozen food compartment.

8. The combination set out in claim 1 wherein;

a. said control means for effecting said independent flow of air comprises a thermostatic control provided in said fresh food compartment,
b. said thermostatic control actuating said air circulating means in said fresh food compartment independent of said operation of said air circulating means in said frozen food compartment.

* * * * *